United States Patent [19]

Griffith

[11] Patent Number: 4,871,406
[45] Date of Patent: Oct. 3, 1989

[54] PROCESS FOR ON-LINE LAMINATION OF PLASTIC

[75] Inventor: Edwin D. Griffith, Canton, Ohio

[73] Assignee: Nekoosa Packaging Corporation, Toledo, Ohio

[21] Appl. No.: 168,958

[22] Filed: Mar. 16, 1988

[51] Int. Cl.⁴ .................................. B32B 31/08
[52] U.S. Cl. ........................ 156/82; 156/205; 156/206; 156/208; 156/210; 156/244.11; 156/244.17; 156/244.24; 156/272.6
[58] Field of Search ............... 156/205, 206, 208, 210, 156/82, 244.11, 244.17, 244.24, 462, 470, 471, 472, 473, 497, 272.6

[56] References Cited

U.S. PATENT DOCUMENTS

| | | | |
|---|---|---|---|
| 3,256,126 | 6/1966 | Bachofen | 156/210 |
| 3,308,006 | 3/1967 | Kresse et al. | 428/186 |
| 3,326,737 | 6/1967 | Hyland | 156/470 |
| 3,379,593 | 4/1968 | Maze et al. | 156/470 |
| 3,616,010 | 10/1971 | Dunholter | 156/470 |
| 3,619,242 | 11/1971 | Ogawa et al. | 156/82 |
| 3,723,222 | 3/1973 | Kurita et al. | 156/205 |
| 3,811,987 | 5/1974 | Wilkinson et al. | 156/205 |
| 3,849,224 | 11/1974 | Hintz et al. | 156/208 |
| 3,892,613 | 7/1975 | McDonald et al. | 156/205 |
| 3,920,496 | 11/1975 | Wilkinson et al. | 428/186 |
| 3,981,758 | 9/1976 | Thayer et al. | 156/470 |
| 4,038,122 | 7/1977 | DeLigt | 156/205 |
| 4,086,116 | 4/1978 | Yazaki et al. | 156/205 |
| 4,202,723 | 5/1980 | Chaudhuri | 156/470 |
| 4,300,969 | 11/1981 | Frydendal | 156/244.24 |
| 4,430,135 | 2/1984 | Schmukler et al. | 156/244.11 |
| 4,455,184 | 6/1984 | Thompson | 156/244.11 |
| 4,544,597 | 10/1985 | Peer et al. | 428/186 |
| 4,765,855 | 8/1988 | Geoffroy-Dechaume | 156/210 |

Primary Examiner—Caleb Weston
Attorney, Agent, or Firm—John R. Nelson

[57] ABSTRACT

A corrugated paperboard, manufactured with a layer of plastic film approximately 1-3 mil thickness, is laminated to the single face liner of single face board in the double-backer. The board has good moisture vapor transmission (MVT) properties for packaging food and chemical products. The film is supplied in roll form and reeved over a dewrinkling roll device to smooth it, then fed onto the single face liner as the single face corrugated is fed into the nip of the double-backer. The lamination of the film is made by the residual heat from the paper and pressure of the double-backer belt in the drying section of the corrugator without adding adhesives or other compounds. The film is a thermoplastic co-extruded polymeric film, e.g. high density polyethylene (HDPE), polypropylene, PET, having a heat seal layer thereon of a copolymer of olefin with Alpha-Beta monoethylenically unsaturated monomer, e.g., ethylene acrylic acid (EAA). The film surface of the manufactured board may be optionally treated with Corona discharge or high velocity flame treatment to oxidize the surface to enhance adhesive bond in later prepared cartons made from the board. The process is applicable to single wall or multiwall corrugated paperboard in making a vapor barrier product having good MVTR.

23 Claims, 3 Drawing Sheets

PROCESS FOR ON-LINE LAMINATION OF PLASTIC

The present invention relates to an improved method of manufacture of corrugated paper on a corrugator in which a film of plastic is laminated onto a surface of the kraft liner paper in the corrugator during the manufacture of the corrugated paperboard.

BACKGROUND ART

The present invention relates to improvements in corrugated paperboard manufacture. Typically such corrugated paperboard is manufactured rom two or more liners and fluted medium. To produce a double-lined single wall corrugated board, a single-face liner and a double-face liner are used. The fluted medium is produced and glued to the single-face liner to form the single-face web. This web is then glued to the double-face liner to form the corrugated board. In cases where a plastic film or wax coating is desired on one face of the corrugated board, it is taken from the corrugator in sheets and processed as sheets through a device in which the plastic film is adhesively laminated or adhered onto the board, or the board is passed through a roller coater in which a layer of wax in liquid form is flowed over and roller-coated onto the corrugated board as is desired. These off-line coatings of film or wax have been used to enhance the barrier properties of the corrugated board. Extrusion laminated polyethylene structures have been made before in which the plastic is buried between two layers of kraft paper. In other cases, packages made of corrugated board have used separate polyethylene plastic bags enclosing them to provide product protection. The off-line extrusion or coating methods have not been economical or practical for commercial production.

In the production of corrugated paper, the heat of drying the adhesive involves contacting the paper with preheat drums, hot plates and the like which operate at temperatures on the order of 350° F. This exceeds the softening point of plastics, such as polyethylene, and the extrusion coating and adhering of the plastic with the liner paper results in softening the plastic and a subsequent transfer of the plastic material to the drums and hot plates of the corrugator equipment results, which is unacceptable for continued production.

SUMMARY OF THE INVENTION

The present invention is directed to a method of producing a plastic laminated corrugated paperboard on-line in the corrugator using the heat and process cycle of the corrugator to perform the lamination. The plastic is added as a film to the single-face liner surface in the double-backer after the liner paper has been put through the single facer and subjected to contact with the drum heaters at the double-face glue station. The laminating utilizes heat imparted to the single-face liner in the corrugating operation plus the heat of the hot plate section which heat seals the film onto the liner paper surface in the double-backer. The film is maintained in spaced relationship opposite the hot plates in the dryer section of the corrugator. The film in smooth, unwrinkled condition contacts the single-face liner side of the corrugated board at about the stage the double-face liner is joined to it in the double-backer, and is held against the single-face liner by the belt of the double-backer. The heat of the corrugator laminates the film on the kraft liner without using adhesives. The corrugated paperboard web that exits the dryer section has on one surface a laminated plastic film surface as part of the manufactured paperboard. Subsequently, the web is processed into sheets of finite dimension and stacked in the usual fashion.

An important feature of the invention is the application of heat to the plastic film away from hot-plate surfaces, pre-heat drums or like surfaces such that melted plastic does not coat or contaminate the surfaces of the apparatus. Relatively low temperature resistant films, such as inexpensive high density polyethylene, may be used in production of the corrugated paperboard producing a moisture vapor barrier property superior to wax coatings and off-line plastic film coatings previously used and at a cost that is competitive with the processes of producing laminated plastic to paperboard product.

Another important feature of the invention is the film laminated corrugated paperboard structure produced by the method of the invention has excellent moisture vapor transmission rates (MVTR). Furthermore, the film laminate of this structure will not be subject of cracking at the carton scores and folds and the plastic material will not rub off or flake off onto the product packaged in the carton. A plastic film composition may be selected that is FDA and USDA approved for use in packaging food that will come into contact with the plastic.

The present invention utilizes the corrugator equipment in use today to manufacture single wall corrugated paperboard or multiwall corrugated paperboard. A plastic film in web form that is approximately the width of the corrugated paper web is guided in smooth surface condition onto the single face liner paper at the nip of the double-backer drive belt and the single face liner at the entrance of the double-backer section of the corrugator. The single face liner preheat drums and the double-backer steam chests provide the heat to the paper that is required for making the lamination of the plastic onto the paper and the double-backer belt and weight rollers provide the necessary pressure. The plastic film materials for use in this on-line method of lamination are co-extruded structures of thermoplastic polymeric film. In a preferred form a polyolefin e.g. polyethylene or polypropylene, or polyester, e.g. polyethylene terraphthalate, is co-extruded along with a copolymer of olefins with alpha-beta monoethylenically unsaturated monomers, such as acrylic acid, methyl acrylic acid, methyl or ethyl acrylate or methocylate vinyl acetate. A specific film is a co-extruded High Density Polyethylene (HDPE) and heat seal of layer Ethylene Acrylic Acid. Another specific co-extruded film which may be used is polypropylene coated with a heat seal layer, or a polyester film coated with a heat seal layer.

As the demand on corrugator speed may need to be increased, or activation temperature of the heat seal layer of the co-extruded film is of a higher temperature, it is feasible to supplement the heat source of the corrugator. This heat supplement may be augmented by single face web preheater, controlled through its wrap arm, or by addition of a further single face preheater.

The plastic film on a roll is unwound under some tension and guided by a turning bar and spreader roll onto the uppermost paper surface of the single face web just prior to the double-backer drive belt and single face liner interface or nip which is at the entrance of the double-backer station. As the web goes through the double-backer of the corrugator, the temperature of the single face paper web and the doublebacker steam chest sections activate the heat seal layer of the film. The double-backer belt and rollers apply pressure and the film is laminated with the liner paper.

The process may include an optional film treating station at the double-backer exit to treat the plastic surface of the paperboard web to enhance adhesion of aqueous adhesives used in assembly of cartons made from the produced film laminated corrugated board. Such treating station may be equipped with Corona discharge device or high velocity flame system. As an alternative, the film surface may be treated selectively or overall by similar technique in the printer-slotter equipment at the time carton blanks are made from the film laminated corrugated board. This treatment oxidizes the plastic surface sufficiently to enable adhesives to be operable or to fix printing inks on that surface should it be useful in the carton- making to do so.

DETAILED DESCRIPTION OF THE DRAWINGS

Figure 1:
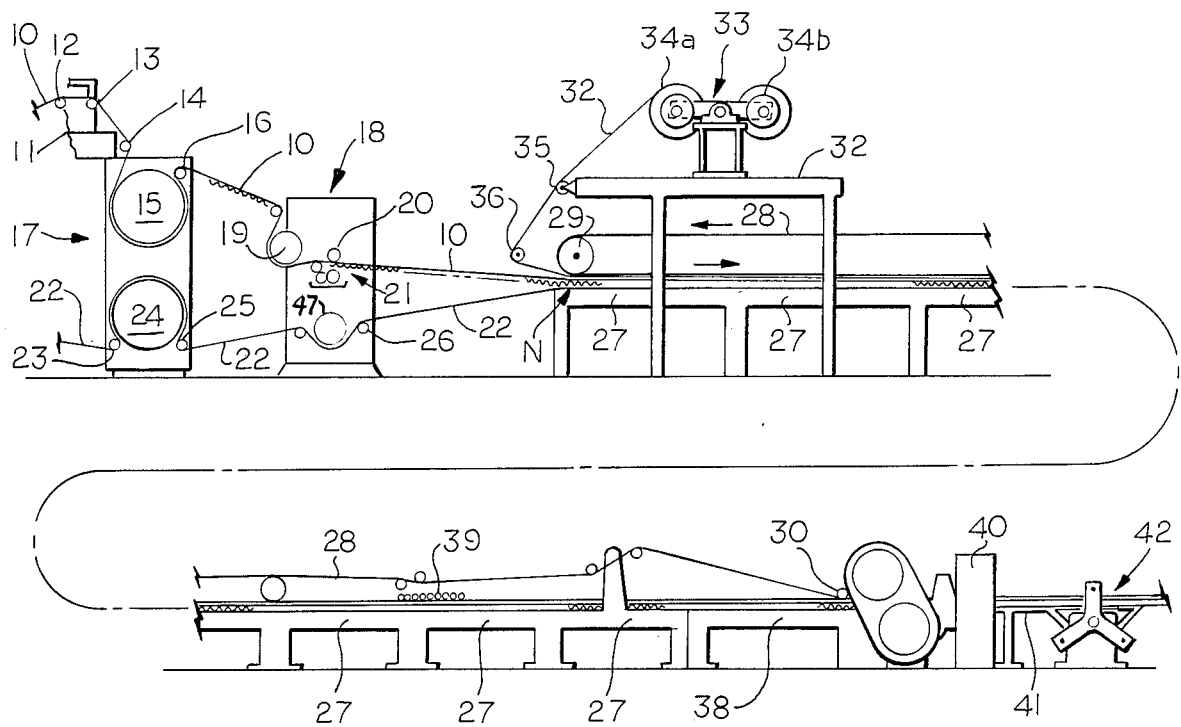
FIG. 1 is a partial diagrammatic representation showing the process of the invention in a single wall corrugated paperboard manufacturing facility in which a plastic film supply mechanism feeds a layer of film in the on-line process at the double-backer unit placing the film onto the single face liner of the single face web as it enters the double-face web heaters of the double-backer section of the corrugator.

FIG. 1 for the most part illustrates a typical corrugator for manufacture of single wall corrugated paperboard. A single face web of paper 10 is formed on a single facer in which a ply of kraft paper medium is corrugated to form cross-wise flutes in the web and joined with a web of single face liner paper. In the single facer, these webs, the corrugated medium and single face liner, are joined together by adhesive. The moisture of the paper components is controlled and the temperature thereof is adjusted through adjustable wrap arms of the single facer (not shown). The wrap arms provide a control of the heat by the span of the circumference of the heater drums the paper web contacts. Moving the wrap arms changes this circumferential distance the web runs on the heater drum. The partially manufactured single face 10 is accumulated on the bridge 11 of the corrugator and then over guide rollers 12 and 13. The first wrap arm has a roller 14 that guides the single face 10 onto the heater drum 15 which is heated on its surface and typically operates at around 350°–375° F. The take-up roller 16 of the wrap arm guides the single face 10 to the input of the double-backer glue station 18 whereat the web 10 passes over drum 19 which is heated to control the temperature of the paper and the fluted side of single face 10 is exposed to the adhesive applied to the crests of the flutes by the roller 21 guided by roller 20.

Simultaneously, and in step with the single face web 10, is a web of double-face liner paper 22 supplied continuously to the roller 23 of the wrap arm apparatus and over the heater drum 24 then past the guide roller 25. The temperature of the double-face liner is controlled by the span of circumferential contact it has with drum 24. Typically, the heater drum for the double-backer liner paper is operated at 350°–375° F. Next, web 22 enters the double-backer glue stand 18 and passes under heater drum 47 controlled for heat exposure by the wrap arm.

Both the single face web 10 and double-face liner 22 enter the drying section 27 of the corrugator. The paper is held on the hot plates in section 27 by the double-backer belt 28 that is driven in the direction shown (by arrows on FIG. 1) by the end pulleys 29, 30. The belt 28 maintains pressure on the joined webs of paper that will make up the single wall corrugated product.

In the present invention, a super structure 32 extends above the double-backer belt and supports a roll stand 33 for the rolls of plastic film 34a and 34b. The roll stand is preferably constructed to support one active roll of the film 34a and a standby roll 34b in known fashion. As the supply of plastic runs out on the active roll, the standby roll 34b is spliced into the web. Either roll, when active, is rotated about a horizontal axis and controlled by an air brake to regulate the tension in the film during feeding the film web. The film 32 extends over a turning bar 35 and onto spreader roll 36. Film leaving the spreader roll 36 is laid in intimate contact with the top (exterior) surface of the single face liner paper and pressed into contact by the double-backer at the nip N of the double-backer between belt 28 and hot plates of drying section 27.

The spreader roll 36 is surfaced with rubber and grooved in counter-rotating spirals 36a and 36b (FIG. 3) that extend from the lateral center of the roll toward the opposite ends. Spreader rolls of this type are also available made with metal surfaces and grooved in a similar fashion. The spreader roll is mounted on a transverse center shaft 36c that allows free rotation of the roll by engaging the film web moving over it. The spirals 36a and 36b remove wrinkles in the film, working any wrinkle of the film toward the opposite lateral outer edges. An example of such a spreader roller is manufactured by American Roller Company and sold under the trademark "Arco Stretcher". The turning bar roll 35 (FIG. 1) provides required amount of film wrap over the spreader roll 36 for dewrinkling the film by the spreader roll. In the example of spreader roll used in the process, the spiral grooves are approximately 1/16 inch to 3/32 inch wide. The spirals emanating in either direction from the center zone of the roll are parallel and about ¾ inch apart. The turning bar roll 35 position may be in an adjustable support for this purpose and may be coupled with idlers for the sufficient amount of wrap to accomplish the dewrinkling step on the film web as it moves into contact with the single face liner 10 at the nip N between the double-backer belt 28 and the single face web 10 upon entry to the drying section 27.

In the corrugator, the single face liner preheat drum 15 and the double-backer steam chests in the heaters 24 and 27 provide the heat in the single face liner required for lamination of the film 32 with the single face liner paper of web 10, and the double-backer belt 28 and weight rollers 39 provide the necessary pressure for laminating the film onto the paper.

As shown on FIG. 1, the joined film and corrugated move through drying section 27 over which the double-backer belt 28 is received and driven toward the exit from the corrugator. Weight rollers 39 cooperate and roll on the top side of belt 28 to supply pressure, as was mentioned. A cooling section 38 extends to the rear of the corrugator. An optional surface treating apparatus 40 is positioned in the path of the combined web. Thereafter, the web moves over the lead-in table 41 to the slitter-scorer 42 and then to the cut-off knives and the stackers (not shown) where the finished board is deposited onto stacks.

The lamination by this method does not require excess pressure in the nip of the double-backer which might otherwise deform or crush the corrugations or tear the corrugation from its adhesive attachment to the single face liner paper. The nip pressures in the double-backer of this process are the same as used in normal corrugator operation for making double-backed single wall corrugated paperboard.

The apparatus 40 is a Corona discharge unit. As an alternative, a high velocity flame system may be used in its place. Either device is known in use today and is used in the present invention for oxidizing the exposed surface of the film on the combined web for promoting adhesion of aqueous adhesives used later in fabricating cartons or like articles from the board product.

The film used in the above-described corrugating method is a co-extruded coated plastic film, which has a heat seal layer capable of being activated at temperatures produced in the paper in the double-backing phase of the corrugating operation. Supplemental heat, if required, may be added in the double-backer operation just prior to the corrugated components' entering the drying section 27.

An example of the film is a co-extruded High Density Polyethylene (HDPE) combination with Ethylene Acrylic Acid (EAA) in the heat seal layer of the film. Dow Chemical Company, Midland, Mich., manufactures and markets its film numbers XO-66300.14, XO-66300.27, XU-66320.01 and XO-66300.11, which have the aforementioned properties and are satisfactory for use in the method. Additional films of this type are available and may be suitable for use in the method, e.g. co-extruded Polypropylene (PP) film and EAA, or a Polyester (PET) film coated with EAA.

The plastic film of Dow Chemical Company used in the process, as per example, and identified by product number comprise a co-extruded polyethylene and co-polymer of ethylene and acrylic acid; polymer content >85%, clear in color, however, may be used in various colors produced by available dyes and pigments. The MVTR rate for XO 66300.11 film, 1.0 mil thick, is 0.5 gm per 100 square inches per 24 hour. Temperature resistance is in the 240°-250° F. range.

The films preferably are in the range of 1–3 mil thickness for satisfactory moisture vapor transmission rates (MVTR) and for conservation of material and cost competitiveness. Such film, as given in the above examples, eliminates cracking at the box scores and folds. The films contemplated for use in this invention do not rub off or flake off onto or co-mingle with packaged product. The materials of the examples given are FDA and USDA approved for use in direct contact with food product in their use in packaging such products.

Figure 3:
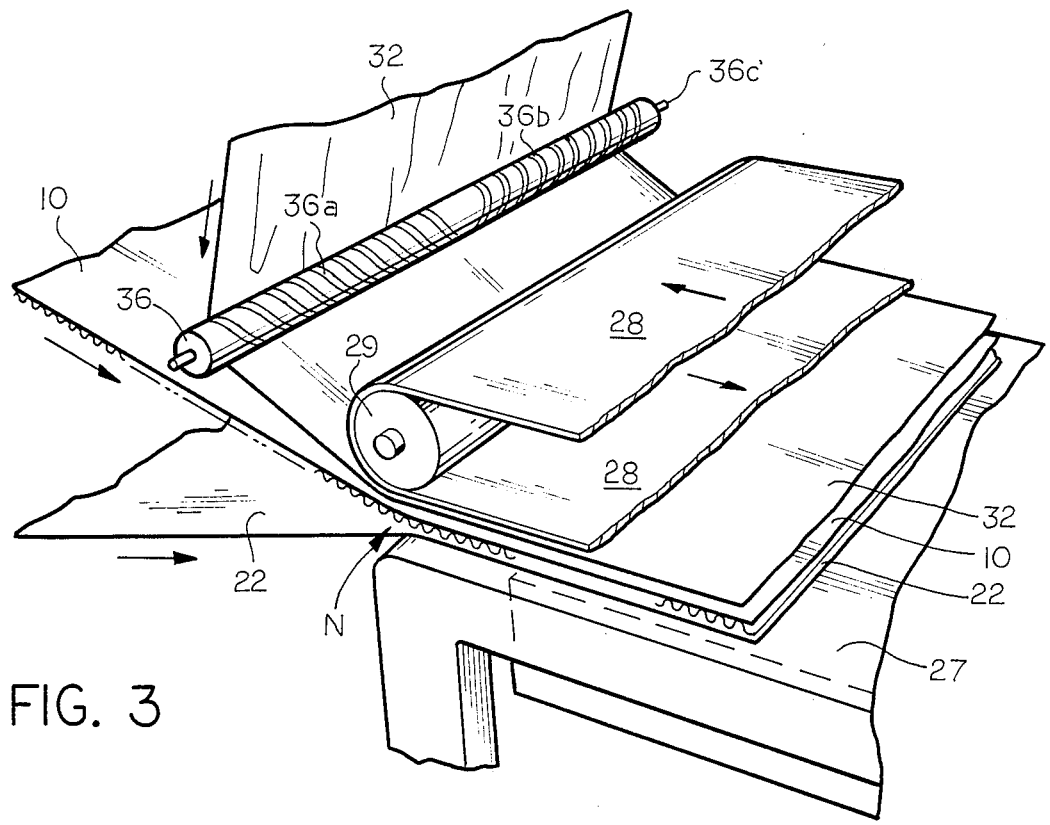
FIG. 3 is a partial perspective view of the single wall corrugator illustrated on FIG. 1 showing the film web advancing over a spreader roll for dewrinkling the film web just before it is united onto the single face liner of the single face web, the film being fed into the nip between the double-backer belt and the single face web.
Figure 4:
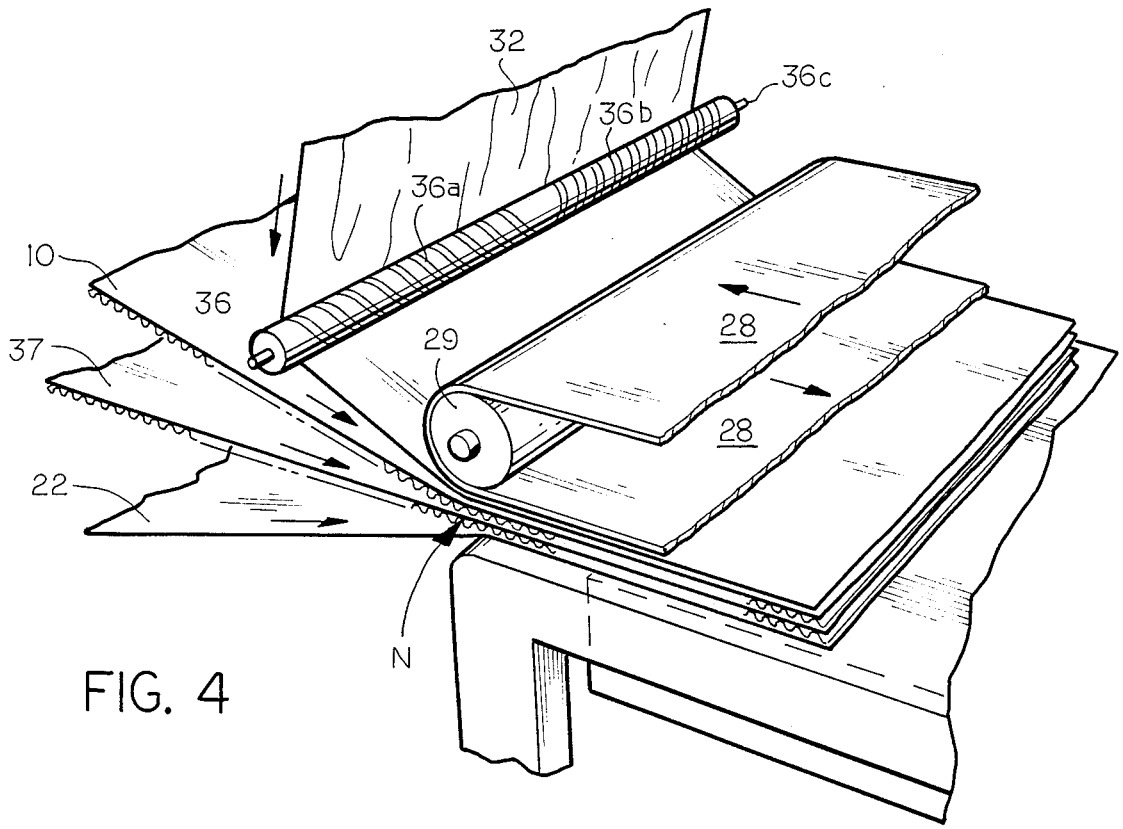
FIG. 4 is a partial perspective view of the double wall corrugator illustrated on FIG. 2 showing the film web advanced over a spreader roll for dewrinkling the film web just before it is united onto the uppermost single face liner of the single face web, the film being fed into the nip between the double-backer belt and the single face web.

Typical corrugator operating conditions for laminating the co-extruded film, such as Dow Chemical XO-66300.14 film of HDPE and EAA, in which the specific heat seal layer activation temperature is approximately 190° F. occurs in the corrugator running at a 210°-220° F. single face liner surface temperature at the double-backer nip (see reference point N on FIGS. 3 and 4). In the examples of materials given, the heat seal layer's activation temperature will be in the range of 180°-220° F. This temperature range is maintained within the drying section 27 of the double-backer as well. Using a 42 lb. liner paper on the single face and double-back liner, making C flute corrugated, the 1–3 mil range of film is applied to the web at corrugator speed of approximately 450 feet per minute production speed. The result is good film lamination and good board quality under the conditions indicated.

Figure 5:
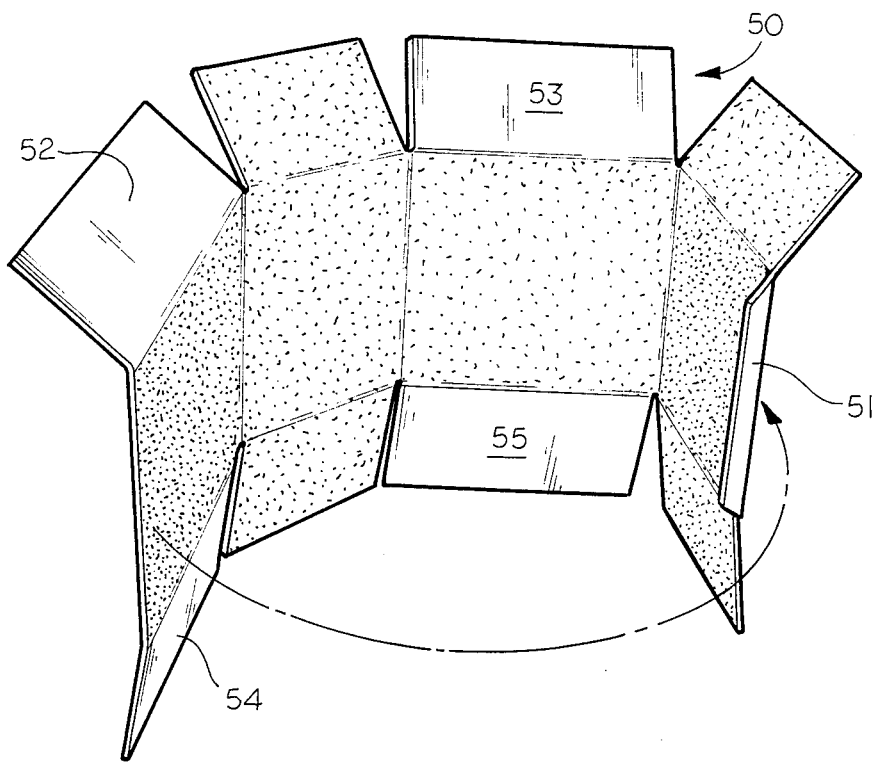
FIG. 5 is a perspective view of a formed blank for a typical carton made from corrugated paperboard produced in the method of the invention in which the interior surface of the carton blank is laminated with a layer of plastic film and the blank is treated at selected areas for gluing the blank to form the finished carton.
Figure 6:
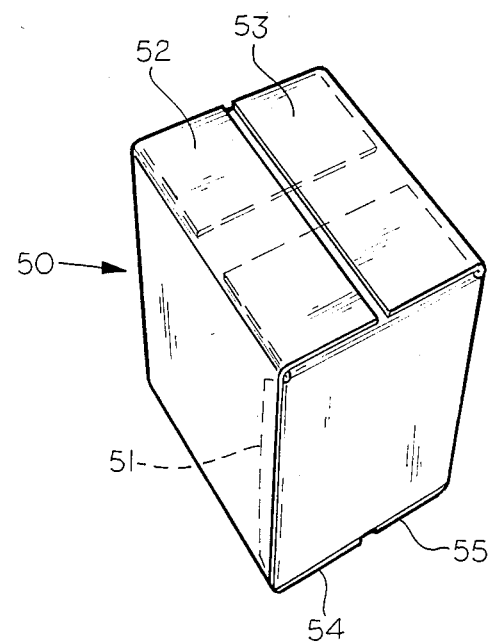
FIG. 6 is a perspective view of a finished carton assembled from the blank of FIG. 5 and glued to seal product, this carton using the corrugated paperboard produced by the method of the invention in which the laminated layer of plastic film is on the interior surface of the carton interposed between the product contained in the carton and the paperboard material to provide a moisture vapor barrier.

The board product produced by this method is formed into blanks from which cartons are manufactured, such as is illustrated on FIGS. 5 and 6. The carton blank 50 of FIG. 5 has the film laminate disposed on the surface that will become the interior of the carton. Areas of the film including areas to be adhesively sealed in the carton, are treated with Corona discharge or high velocity, oxidizing flame treatment to allow usual aqueous adhesives used in carton fabrication to successfully adhere the plastic film surface of the corrugated to an adjacent liner paper surface. Typically, these surface areas are at the tab 51 for making a manufactures joint, the upper flaps 52 and 53 for adhesively sealing the top of the carton, and the bottom flaps 54 and 55 for sealing the bottom of the carton.

Carton constructions of this, or other general types, are used to package meat and poultry in bulk, viscous products such as soft drink syrups, and household chemical products, such as those requiring some hygroscopic protection, e.g. dry detergents.

Figure 2:
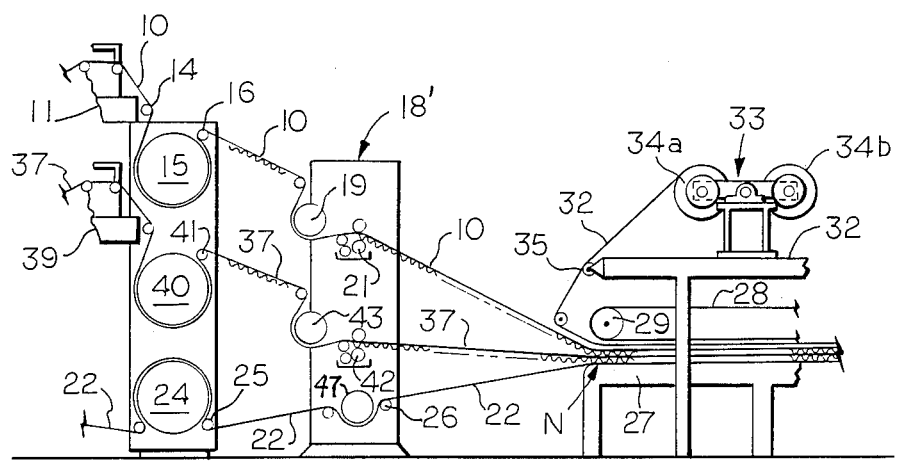
FIG. 2 is a similar partial diagrammatic representation of a double wall corrugated paperboard manufacturing facility showing the on-line incorporation of the plastic film according to the invention onto the single face of the uppermost single face web as it enters the heating section of the double-backer section of the corrugator.

Some uses of corrugated products with good MVTR require multiwall corrugated board, such as double-wall corrugated or triple wall corrugated. These products may be made using the present invention. One example of a multiwall corrugated board manufacture is illustrated on FIGS. 2 and 4. The same or similar parts and components are described using the same reference numerals as were used in the descriptions on the embodiment of FIGS. 1 and 3.

In producing a double-wall corrugated board, two single face webs 37 and 10 are supplied. In this instance, the web 37 is stored on a web bridge 39 and received around heating drum 40 and over its wrap arm 41. The intermediate single face web has glue applied by the applicator 42 after the web passes the heater drum 43. After applying adhesive to the flutes of web 37, it moves directly to nip N of the double-backer and the drying section 27. The upper single face web 10 is stored on the web bridge 11 and from there travels around heater drum 15 controlled by its wrap arm 16; then to the heater drum 19 and through applicator 21 for placing adhesive on the flutes of this single face web. After applying adhesive, web 10 enters nip N of the double-backer and is joined with single face web 37. Simultaneously, double-backer liner web 22 is supplied over heater drum 24 and to the heater drum 47 of the double-backer glue station 18'. Film 32 is supplied by the roll 34a over the turning bar roller 35 and the spreader roller 36 for dewrinkling. The film 32 is laminated to the top surface of the single face web 10 just as the film 32, the upper single face web 10, intermediate single face web 37 and the double-back liner paper 22 all merge as they pass through nip N of the double-backer, whereat the belt 28 and the weights 39 apply pressure to laminate the layers into a double-wall corrugated board having the film layer 32 laminated on the upper surface. The board produced is next processed, heated and cooled in the sections 27 and 38 of the corrugator, as previously described, and surface treated by Corona discharge or oxidizing flame at the device (such as shown at 40 on FIG. 1), then cut to lengths from the web and placed in stacks, as was previously described.

Having described operating embodiments of the process of the invention and the product produced thereby, the process and product of the process may be modified within the scope of the invention of the appended claims.

What is claimed is:

1. The method of manufacturing a plastic film laminated corrugated paperboard comprising the steps of
   (a) continuously moving a web of single face corrugated paper having a single face liner adhesively attached to the corrugated medium toward a drying zone;
   (b) continuously supplying a smooth and wrinkle free web of a preformed plastic film in the direction of movement of the single face corrugated paper;
   (c) moving said film into surface contact with the single face liner paper of said single face corrugated web in the proximity of the entry of said drying zone; and
   (d) pressing the film and corrugated paper together to laminate the two in the drying zone.

2. The method of claim 1 in which double-back liner paper is heated and supplied in a web moving in the direction of said single face corrugated web, the double-back liner paper engaging exposed adhesively treated flutes of the corrugated medium on the single face at the drying zone at a side opposite the plastic film, the completion of the formation of a double-backed corrugated paperboard occurring simultaneously with the surface lamination of the plastic film on the single face liner paper.

3. The method of claim 2 in which the corrugated, film laminate is moved through a treating zone after the said drying zone to oxidize the exposed plastic surface.

4. The method of claim 3 in which the treating zone includes a Corona discharge device for surface treating the plastic on the surface of the corrugated web.

5. The method of claim 3 in which the treating zone includes a high velocity flame-treating device for oxidizing the plastic on the surface of the corrugated web.

6. The method of claim 1 in which the preformed plastic film is a thermoplastic co-extruded polymeric plastic comprising a polyolefin and a copolymer of olefins with alpha-beta monoethylenically unsaturated monomers.

7. The method of claim 6 wherein said plastic film is co-extruded H.D.P.E. and ethylene acrylic acid.

8. The method of claim 6 wherein said plastic film is co-extruded polypropylene and ethylene acrylic acid.

9. The method of claim 6 wherein said plastic film is co-extruded polyethylene terephthalate 10. The method of claim 1 in which said plastic film is in the range of 1.0 –3.0 mils thickness.

11. The method of claim 1 in which the single face liner temperature of the web is at a temperature above 190° F. at said time the film is moved into surface contact with it.

12. The method of claim 11 in which the single face liner temperature is in the range of 210°–220° F. at the time said film is moved into surface contact with it.

13. The method of claim 12 in which the said web is moving at a rate of approximately 450 feet per minute.

14. The method defined in claim 6 wherein said preformed film is supplied from a roll as a web which extends onto a spreader roll for continuously supplying the smooth and wrinkle-free web of said preformed plastic film.

15. The method of manufacturing a plastic film laminated corrugated paperboard comprising the steps of
   (a) continuously moving a first web of single face corrugated paper having its single face liner adhesively attached to the flutes of a corrugated medium toward a drying zone;
   (b) continuously moving a second web of single face corrugated paper having its single face liner adhesively attached to the flutes of a corrugated medium toward a drying zone in step with said first web and disposed beneath said first web;
   (c) moving a web of double-back liner paper toward the drying zone in step with said second web;
   (d) adhesively securing the exposed flutes of said first web to the liner of said second web and adhesively securing the double-back liner paper to the exposed flutes of said second web;
   (e) continuously supplying a smooth and wrinkle free web of preformed plastic film in the direction of said first and second single face webs,
   (f) moving said film into surface contact with the exposed surface of the liner of said first web in the proximity of the entry of said drying zone;
   (g) pressing said film, the said first and second corrugated webs and the said double-back liner together during movement through the drying zone to laminate the film onto the first single face web and form a plastic laminated, surface coated double-wall corrugated board.

16. The method of manufacturing corrugated paperboard having a moisture vapor transmission (MVT) barrier utilizing a corrugated paper making system in which a fabricated single face corrugated paper web is continuously supplied to the nip of the double-backer, and a double-back liner is continuously supplied for adhesively attaching it to the flutes of the corrugated medium of said single face web in the double-backer, the improvement comprising:
   (a) continuously supplying a web of preformed thermoplastic co-extruded polymeric film from rolls, said film including therein a heat seal layer that is activated at an elevated temperature in the range of approximately 180°–220° F.;
   (b) smoothing the web of said film to be devoid of wrinkles, by passing it over a dewrinkling device;
   (c) moving said smooth web of the plastic film into surface contact with the single face liner paper of the single face corrugated in the proximity of said corrugated entering the nip of the double-backer; and
   (d) pressing said film onto the corrugated web in the double-backer to laminate the film on the single face liner, thereby producing a film laminated corrugated paperboard having a MVT barrier.

17. The method of claim 16 in which the film comprises a co-extruded polyester and a copolymer of olefins with Alpha-Beta monoethylinically unsaturated monomers as a heat seal layer.

18. The method of claim 17 in which the polyester comprises polyethylene-terephthalate.

19. The method of claim 16, in which the film comprises a co-extruded polyolefin and a copolymer of olefins with Alpha-Beta monoethylinically unsaturated monomers as a heat seal layer.

20. The method of claim 19 in which the heat seal layer comprises an acrylic acid.

21. The method of claim 20 in which the heat seal layer comprises ethylene acrylic acid.

22. The method of claim 19 in which the polyolefin comprises high density polyethylene.

23. The method of claim 19 in which the polyolefin comprises polypropylene.

* * * * *